(12) United States Patent
Ando

(10) Patent No.: US 6,208,051 B1
(45) Date of Patent: Mar. 27, 2001

(54) SPINDLE APPARATUS

(75) Inventor: Shigenori Ando, Narashino (JP)

(73) Assignee: Seiko Seiki Kabushiki Kaisha (JP)

( * ) Notice: Subject to any disclaimer, the term of this patent is extended or adjusted under 35 U.S.C. 154(b) by 0 days.

(21) Appl. No.: 08/414,004

(22) Filed: Mar. 17, 1995

(30) Foreign Application Priority Data

Mar. 17, 1994 (JP) .................................................. 6-047418

(51) Int. Cl.$^7$ .................................................. H02K 7/09
(52) U.S. Cl. ............................................. 310/90.5; 310/90
(58) Field of Search ............................................. 310/90.5

(56) References Cited

U.S. PATENT DOCUMENTS

| | | | |
|---|---|---|---|
| 4,642,500 | * 2/1987 | Higuchi et al. | 310/90.5 |
| 4,686,004 | * 8/1987 | Nakazeki et al. | 310/90.5 |
| 4,841,204 | 6/1989 | Studer | 318/254 |
| 4,885,491 | * 12/1989 | Hiyama et al. | 310/90.5 |
| 5,053,662 | * 10/1991 | Richter | 310/90.5 |
| 5,093,754 | * 3/1992 | Kawashima | 361/144 |
| 5,313,399 | * 5/1994 | Beale | 364/463 |
| 5,355,042 | * 10/1994 | Lewis et al. | 310/90.5 |
| 5,469,007 | * 11/1995 | Toyama | 310/90.5 |

FOREIGN PATENT DOCUMENTS 0291931  11/1988 (EP).
0315469   5/1989 (EP).

OTHER PUBLICATIONS

Patent Abstract of Japan, vol. 11, No. 11 (E–470) Jan. 13, 1987.
VDI Zeitschrift, vol. 132, No. 12, Dec. 1990, Dusseldorf, Germany, pp. 77–79, V. W. Horsemann, "Prozebregelung beim Innernrundschleifen mit aktiv magnetelagerten Spindeln".

* cited by examiner

Primary Examiner—Elvin Enad
(74) Attorney, Agent, or Firm—Adams & Wilks

(57) ABSTRACT

A spindle apparatus comprises a rotary body and at least a pair of magnetic bearings for levitating the rotary body by magnetic forces. A combined motor and magnetic bearing device is disposed between the magnetic bearings for imparting a rotational torque to the rotary body and for positionally controlling the rotary body by magnetic forces. A control circuit outputs and exciting current to the magnetic bearings and the combined motor and magnetic bearing device and for makes an adjustment of the exciting current of the magnetic bearing and the combined motor and magnetic bearing device to hold the rotary body afloat in a predetermined position.

16 Claims, 3 Drawing Sheets

SPINDLE APPARATUS

BACKGROUND OF THE INVENTION

The present invention relates to a spindle apparatus and, more particularly, to a spindle apparatus using a magnetic bearing. In some spindle apparatus, in order to realize a super high speed rotation, or a long term non-maintenance or the like, a magnetic bearing is leviated floated without any contact with a rotary shaft (i.e., rotary body) by a magnetic force. The magnetic bearing is so constructed that an output of a positional shift sensor for detecting a position of the rotary shaft is fed back to control an excited current of an electromagnet and to control the floating position of the rotary shaft. In this feedback operation, if an imbalance (offset between an axial center and a gravitational center) is present in the rotary shaft, a magnetic force which is in synchronism with a rotary frequency (i.e., rpm) is generated in order to suppress a vibratory rotation of the rotary shaft which is generated due to the imbalance. Accordingly, when the rotary frequency is equal to a natural frequency (resonant frequency), the rotary shaft is resonated by the magnetic force of the magnetic bearing, as a result of which, in particular, in a high speed rotational region, the rotary shaft is deformed to cause a bending vibration.

FIG. 3 shows a state in which a rotary shaft 10 that is floatingly held by a magnetic bearing is subjected to the bending vibration as indicated by dotted lines with nodes at points A and B.

As shown in FIG. 3, the rotary shaft 10 is supported at both ends thereof by four electromagnets 12, 14, 16 and 18. The positional shift in a radial direction of the rotary shaft 10 is detected by positional shift sensors 20, 22, 24 and 26. In general, in the bending vibration, the nodes of the vibration are generated in the vicinity of both ends of the shaft, and also, the support positions of the magnetic bearing, i.e., the electromagnets are located in the vicinity of both ends of the shaft. Accordingly, as shown in FIG. 3, the nodes of the vibration (points A and B) are located in the vicinity of the electromagnets.

Usually, a circuitry or the like for phase compensation on the basis of a PID control (proportional-integral-derivative control) is incorporated into a control circuit for controlling the excited current of the electromagnets in the magnetic bearing. In order to suppress the resonant vibration, an electric damping is applied by using the magnetic force of the electromagnets and the current in the vicinity of the resonant frequency is interrupted by using a filter.

Also, in the prior art, a mechanical damper made of rubber material has been used at a portion C which is a middle portion in the vibration of the rotary shaft 10, thereby suppressing the generation of the bending vibration.

However, as shown in FIG. 3, if the points A and B that are the nodes of the vibration are located at the vicinity of mount positions of the respective electromagnets 12, 14, 16 and 18, the magnetic force of the electromagnets is not applied to the rotary shaft 10 as a force for suppressing the vibration. Accordingly, in the electric damping control using the above-described compensation circuit and the like, it is impossible to suppress the generation of the resonance. Also, in the case where the current in the vicinity of the resonance frequency is interrupted by using the filter, a rigidity of the magnetic bearing is degraded so that the rotary shaft 10 per se is likely to be vibrated by disturbance.

With the mechanical damper, it is possible to suppress the vibration of the middle portion C, but in this case, it is impossible to actively suppress the bending vibration unlike with the electric damping control. Also, the mechanical damper also suffers from a problem in durability.

SUMMARY OF THE INVENTION

It is an object of the present invention to provide a spindle apparatus which is capable of preventing the bending vibration of a rotary shaft.

In order to attain the foregoing object, according to the present invention, there is provided a spindle apparatus comprising: a rotary shaft; a first magnetic bearing for floatingly holding one end end of the rotary shaft by magnetic forces; a second magnetic bearing for floatingly holding another end side of the rotary shaft by magnetic forces; and a magnetic bearing composite motor interposed between the first magnetic bearing and the second magnetic bearing, the magnetic bearing composite motor having a magnetic bearing function for positionally controlling the rotary shaft by the magnetic forces and a motor function for imparting a rotational torque to the rotary shaft by the magnetic forces.

In such a spindle apparatus, the rotary shaft is rotated by the magnetic bearing composite motor and simultaneously the magnetic forces are applied to a portion of the rotary shaft between the first and second magnetic bearings to perform the positional control of the rotary shaft.

DETAILED DESCRIPTION OF THE PREFERRED EMBODIMENTS

To attain the above-noted and other objects, according to a first aspect of the present invention, there is provided a spindle apparatus comprising: a rotary shaft; a first magnetic bearing for floatingly holding one end of the rotary shaft by magnetic forces; a second magnetic bearing for floatingly holding another end of the rotary shaft by magnetic forces; and a magnetic bearing composite motor interposed between the first magnetic bearing and the second magnetic bearing, the magnetic bearing composite motor having a magnetic bearing function for positionally controlling the rotary shaft by the magnetic forces and a motor function for imparting a rotational torque to the rotary shaft by the magnetic forces.

According to a second aspect of the invention, there is provided a spindle apparatus, wherein the first and second magnetic bearings are provided with first and second positional sensors for detecting a position of the rotary shaft for positional control of the rotary shaft; and wherein the magnetic bearing composite motor carries out the positional control of the rotary shaft on the basis of a detected value of one of the first and second positional sensors.

According to a third aspect of the invention, there is provided a spindle apparatus comprising a composite motor positional sensor for detecting the position of the rotary shaft in the vicinity of the magnetic bearing composite motor for controlling the position of the rotary shaft.

According to a fourth aspect of the invention, there is provided a spindle apparatus wherein the magnetic bearing composite motor is used to control the position of the rotary shaft in the vicinity of a frequency at which the rotary shaft is subjected to a bending vibration.

Embodiments of the spindle apparatus according to the present invention will now be described in more detail with reference to FIGS. 1 and 2.

Figure 1:
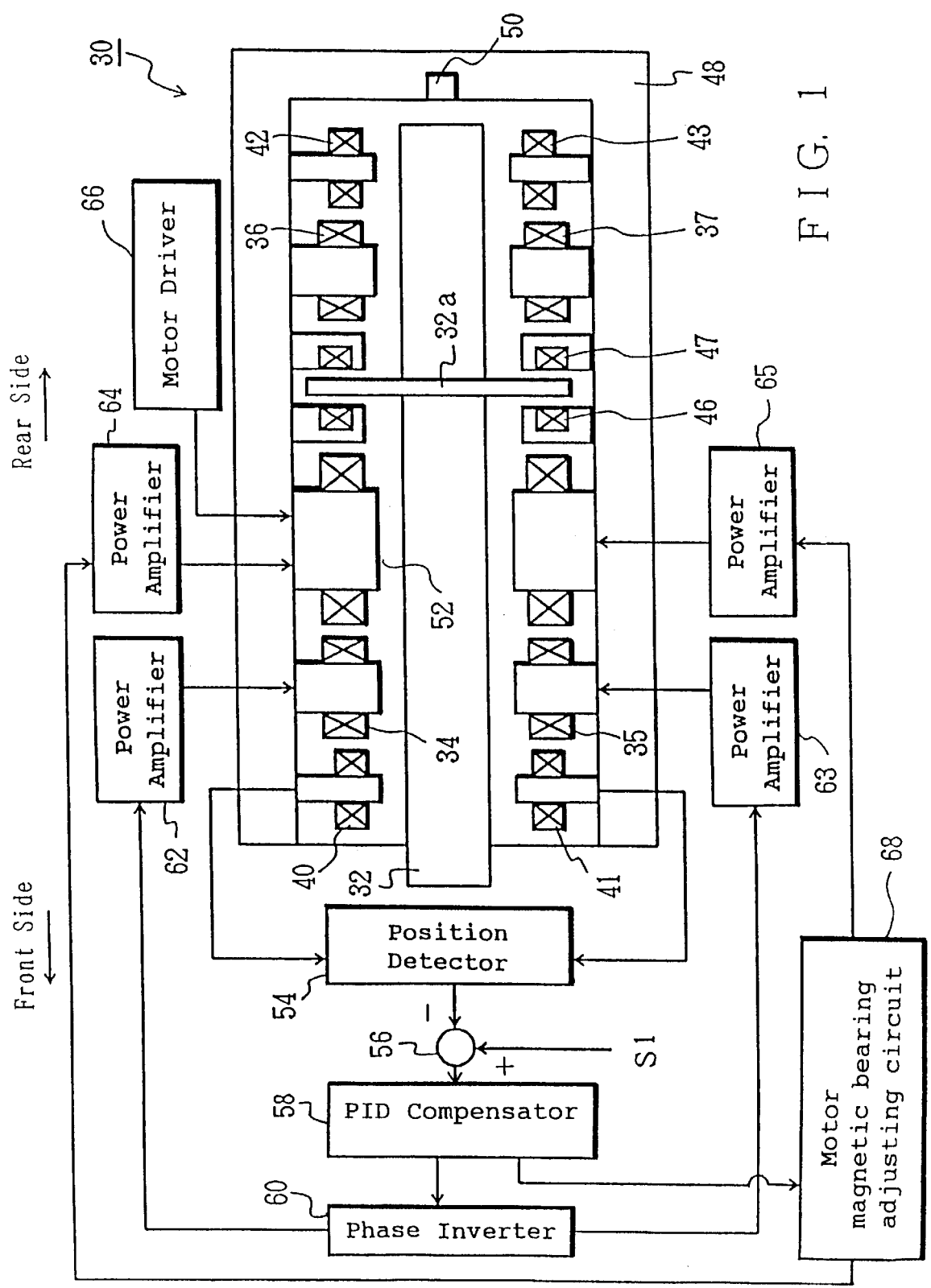
FIG. 1 is a structural view showing a primary part of a spindle apparatus according to a first embodiment of the invention.

FIG. 1 is a structural view representing a primary structure of a spindle apparatus 30 according to a first embodiment. Incidentally, in FIG. 1, the left side is referred to as the front and the right side is referred to as the rear.

The mechanical structural part of the spindle apparatus 30 will first be described. The spindle apparatus 30 includes a rotary body or shaft 32 having a disc-like thrust bearing rotor portion 32a, front electromagnets 34 and 35 and rear electromagnets 36 and 37 which confront each other and clamp the rotary shaft 32. The respective electromagnets 34, 35, 36 and 37 are so arranged as to apply magnetic forces (attractive forces) to the rotary shaft 32 in a radial direction.

A pair of upper and lower front positional sensors 40 and 41 for detecting the positional shift in the radial direction of the rotary shaft 32 are arranged in front of the front electromagnets 34 and 35. Also, rear positional sensors 42 and 43 are arranged in the same manner behind the rear electromagnets 36 and 37. Although not shown, two pairs of electromagnets and positional sensors are provided in the same manner in the direction perpendicular to the paper surface of the FIG. 1, respectively.

Incidentally, in this embodiment, inductance convertor type positional sensors are used as the positional sensors 40, 41, 42 and 43. It is however possible to use any other positional sensors such as a differential transmission type positional sensor, a static capacitance type positional sensor, a hole element positional sensor, an eddy current positional sensor and so on.

The mechanical structural portion of the radial magnetic bearing for leviating floatingly holding the rotary shaft 32 by the radial magnetic forces is composed of the respective electromagnets 34, 35, 36 and 37, the positional sensors 40, 41, 42 and 43 and the electromagnets (not shown) and the positional sensors (not shown).

Also, the spindle apparatus 30 is provided with axial electromagnets 46 and 47 embracing the thrust bearing rotor portion 32a of the rotary shaft 32 in the front and rear sides. Each of the axial electromagnets 46 and 47 is a coil wound in the form of an annular shape around an outer circumference of the rotary shaft 32 so as to apply the axial electromagnetic forces to the thrust bearing rotor portion 32a. An axial positional sensor 50 for detecting the axial positional shift of the rotary shaft 32 is arranged to face the rear end portion of the rotary shaft 32 at a rear portion of a frame 48 of the spindle apparatus 30. The mechanical structure of the thrust magnetic bearing for holding the rotary shaft 32 in the axial direction is composed of the axial positional sensor 50 and the axial electromagnets 46 and 47.

In the foregoing embodiment, a combined motor and magnetic bearing device, hereafter referred to as a magnetic bearing composite motor 52, is interposed between the front electromagnets 34 and 35 and the axial electromagnets 46 and 47.

The magnetic bearing composite motor 52 is one which is composed of the motor function for imparting the rotational force to the rotary shaft 32 and the magnetic bearing function for magnetically floating and positionally controlling the rotary shaft 32. In this embodiment, in the magnetic bearing composite motor 52, a motor winding for generating a rotary magnetic field relative to the rotary shaft 32 and a magnetic bearing winding for generating magnetic force for performing the positional control of the rotary shaft 32 are wound around a ferric core independently of each other.

The magnetic bearing winding is composed of four independent circuits whose windings are used to form four pole electromagnets for generating magnetic forces in the up-and-down direction and the direction perpendicular to the paper surface of FIG. 1 in the same manner as in the respective electromagnets 34, 35, 36 and 37 and the electromagnets (not shown).

A control system for the spindle apparatus will now be described.

The front positional sensors 40 and 41 are connected to a position detector 54 for obtaining positional signals corresponding to the positional shift of the rotary shaft 32 out of the respective positional sensors 40 and 41. The position detector 54 is connected to an arithmetic operator 56 to which a reference signal S1 for commanding the floating position of the rotary shaft 32 is fed.

The arithmetic operator 56 subtracts the positional signal to be fed by the positional detector 54 from the reference signal S1 to output to the PID compensator 58. The PID compensator 58 performs a process for advancing the phase of the signal fed from the arithmetic operator 56 on the basis of the PID control or the like and feeds the output to a phase inverter 60. The phase inverter 60 performs a process for inverting the phase or the like to feed the output to power amplifiers 62 and 63. The power amplifiers 62 and 63 amplify the excited currents of the front electromagnets 34 and 35 corresponding to the signal out of the phase inverter 60.

The feedback control of excited magnetic current of each electromagnet 34, 35, 36 and 37 is carried out by the respective control circuits(i.e., the positional detector 54 and the arithmetic operator 56 and the like) so as to generate the electromagnetic forces for floatingly holding the rotary shaft 32 at a position to be designated by the reference signal S1.

Incidentally, although not shown in FIG. 1, a control circuit for performing a feedback control on the basis of the output of the rear positional sensors 42 and 43 in the same manner is independently provided for the rear electromagnets 36 and 37. A similar control circuit is provided for the electromagnets (not shown) and the like for controlling the rotary shaft 32 in the vertical direction in FIG. 1. Also, a control circuit for performing a similar feedback control on the basis of the output of the axial positional sensor 50 is provided for the axial electromagnets 46 and 47. With the above-described respective electromagnets, control circuits and so on, a five axis control type magnetic bearing for floatingly holding the rotary shaft 32 in five directions (5-axes) is provided.

On the other hand, the motor windings of the magnetic bearing composite motor 52 is connected to a motor driver 66 for feeding a drive electric power. Also, the magnetic bearing windings of the magnetic bearing composite motor 52 is connected, respectively, to power amplifiers 64 and 65 for feeding excited current. In this embodiment, the PID compensator 58 is connected to a motor magnetic bearing adjusting circuit 68 for feeding control signals to the power amplifiers 64 and 65 to use the control circuits of the magnetic bearing and so on as a part of the control system for the magnetic bearing windings.

The motor magnetic bearing adjusting circuit 68 has a filter function for passing only the resonant frequency component generated when the rotary shaft 32 is subjected to the bending vibration, relative to the signals fed from the PID compensator 58. Incidentally, the resonant frequency which causes the bending vibration in the rotary shaft 32 depends upon a shape (ratio between longitudinal and lateral dimensions). Namely, since the resonance frequency is varied in accordance with a weight or the like of a tool or the like to be fixed to the rotary shaft 32, the system is constructed so that the operator may set the frequency component to be filtrated.

Figure 3:
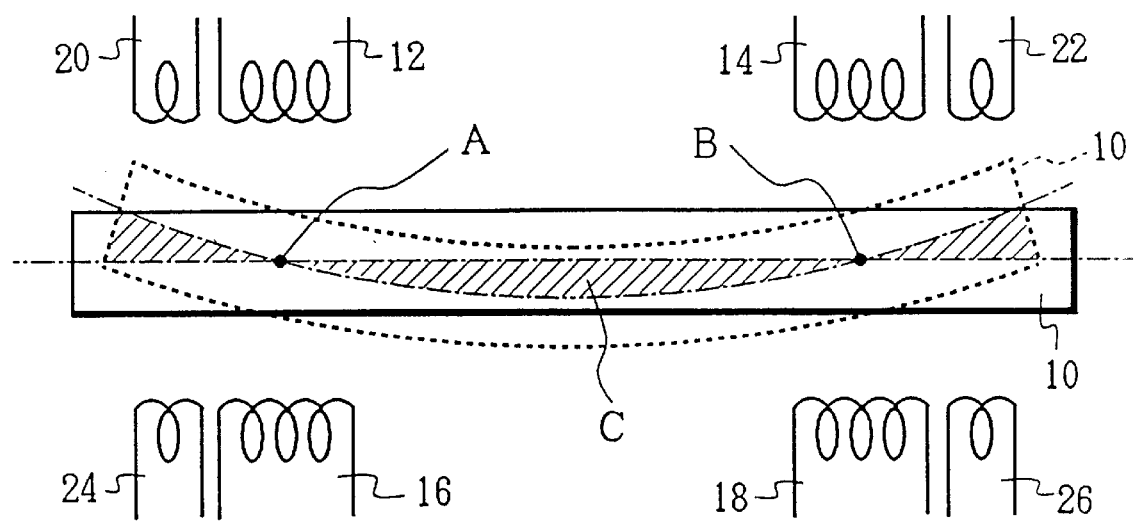
FIG. 3 is an illustration of an example of a vibration condition in case where the rotary shaft is subjected to the bending vibration in the conventional spindle apparatus.

Also, the motor magnetic bearing adjusting circuit 68 is so structured as to invert the phase of the signal to be fed to the power amplifiers 64 and 65, corresponding to the vibration mode when the rotary shaft 32 is vibrated. Namely, as indicated by hatching in FIG. 3, the direction of the vibration (i.e., upper portions in FIG. 3) at the measurement positions obtained by the positional sensors 20, 22 and so on is opposite to the direction of the vibration (i.e., lower portions in FIG. 3) at the portion C in the middle portion of the vibration. As shown in FIG. 1, since the magnetic bearing composite motor 52 is located at the middle portion of the vibration shown in FIG. 3, in the case where the directions of vibration are different between the position of the magnetic bearing composite motor 52 and the measurement positions of the front positional sensors 40 and 41, the motor magnetic bearing adjusting circuit 68 inverts the phase of the signal.

Also, since the amplitudes of the vibration are different between the positions of the front electromagnets 34 and 35 and the position of the magnetic bearing composite motor 52, the motor magnetic bearing adjusting circuit 68 is so structured as to adjust the amplitude values of the signals in view of the distance between the measurement positions of the front positional sensors 40 and 41 and the position of the magnetic bearing composite motor 52.

The operation of the thus constructed embodiment will now be described.

First of all, the rotary shaft 32 is magnetically floated to a position to be designated by the reference signal Si by the respective control circuits and the respective electromagnets 34, 35, 36, 37, 46 and 47. Then, the drive power is fed from the motor driver 66 to the magnetic bearing composite motor 52 whereby the motor windings of the magnetic bearing composite motor 52 cause the rotary magnetic field to be generated to thereby rotate the rotary shaft 32 kept under the floating condition.

At this time, although the signal process in the PID compensator 58 is fed also to the motor magnetic bearing adjusting circuit 68, the frequency component other than the resonant frequency of the bending vibration of the current to be fed to the magnetic bearing windings of the magnetic bearing composite motor 52 is interrupted by the filter function of the motor magnetic bearing adjusting circuit 68. Accordingly, until the rpm of the rotary shaft 32 reaches the resonant frequency, the positional control of the rotary shaft 32 is not carried out by the magnetic bearing function of the magnetic bearing composite motor 52.

When the rpm is increased to reach the resonant frequency, the signal containing the resonant frequency component is fed from the PID compensator 58 to the motor magnetic bearing adjusting circuit 68. The motor magnetic bearing adjusting circuit 68 passes the resonant frequency component of the fed signal, and at the same time, outputs the processed signal to the power amplifiers 64 and 65 through the processes such as a phase inverse, an amplitude adjustment and so on. As a result, the feedback controlled current is Supplied to the magnetic bearing windings of the magnetic bearing composite motor 52 on the basis of the output of the front Positional sensors 40 and 41 to thereby generate the magnetic forces for positionally controlling the rotary shaft 32. Namely, the rotary shaft 32 is subjected not only to the rotational torque but also the magnetic forces in the radial direction for the positional control from the magnetic bearing composite motor 52.

Accordingly, even if the nodes are present at the positions of the respective electromagnets 34, 35, 36 and 37, it is possible to suppress the bending vibration by the magnetic bearing function of the magnetic bearing composite motor 52 positioned at the middle portion of the vibration.

According to this embodiment, the magnetic bearing composite motor 52 is located between the front electromagnets 34 and 35 and the rear electromagnets 36 and 37. So, even if the positions of the front electromagnets or the rear electromagnets or the thrust bearing rotor portion 32a are regarded as the vibration nodes, it is possible to effectively suppress the bending vibration using the nodes therebetween. Also, since the positional control of the rotary shaft 32 is carried out only by the resonant frequency band, it is possible to reduce the power consumption to a lower level. Also, since the magnetic bearing composite motor 52 having the magnetic bearing function and the motor function together is used, it is possible to suppress the bending vibration of the rotary shaft 32 without increasing the axial length of the rotary shaft 32 and the enlargement of the spindle apparatus 30.

Also, since the bending vibration is actively suppressed by the electric damping by the magnetic bearing composite motor 52 using the PID compensator 58, it is possible to effectively carry out the damping in comparison with the mechanical damper. In addition, since it is of the non-contact type, the electric damping is superior also in durability.

Furthermore, since the control circuit of the magnetic bearing composite motor 52 is used commonly for the control circuits(i.e., 54, 56, 58 and so on) of the magnetic bearing, it is possible to suppress the increase of the manufacturing cost of the spindle apparatus 30 in comparison with the case that the positional sensor or the control circuit is provided specially for the magnetic bearing composite motor 52.

Incidentally, in the foregoing embodiment, the control circuits of the front electromagnets are commonly used in order to control the current of the magnetic bearing windings of the magnetic bearing composite motor 52. However, in the spindle apparatus in which the thrust magnetic bearing is provided adjacent to the front electromagnets, it is possible that the control circuits for the magnetic forces of the rear electromagnets on the basis of the rear positional sensor are commonly used in order to control the current of the magnetic bearing windings of the magnetic bearing composite motor 52.

Figure 2:
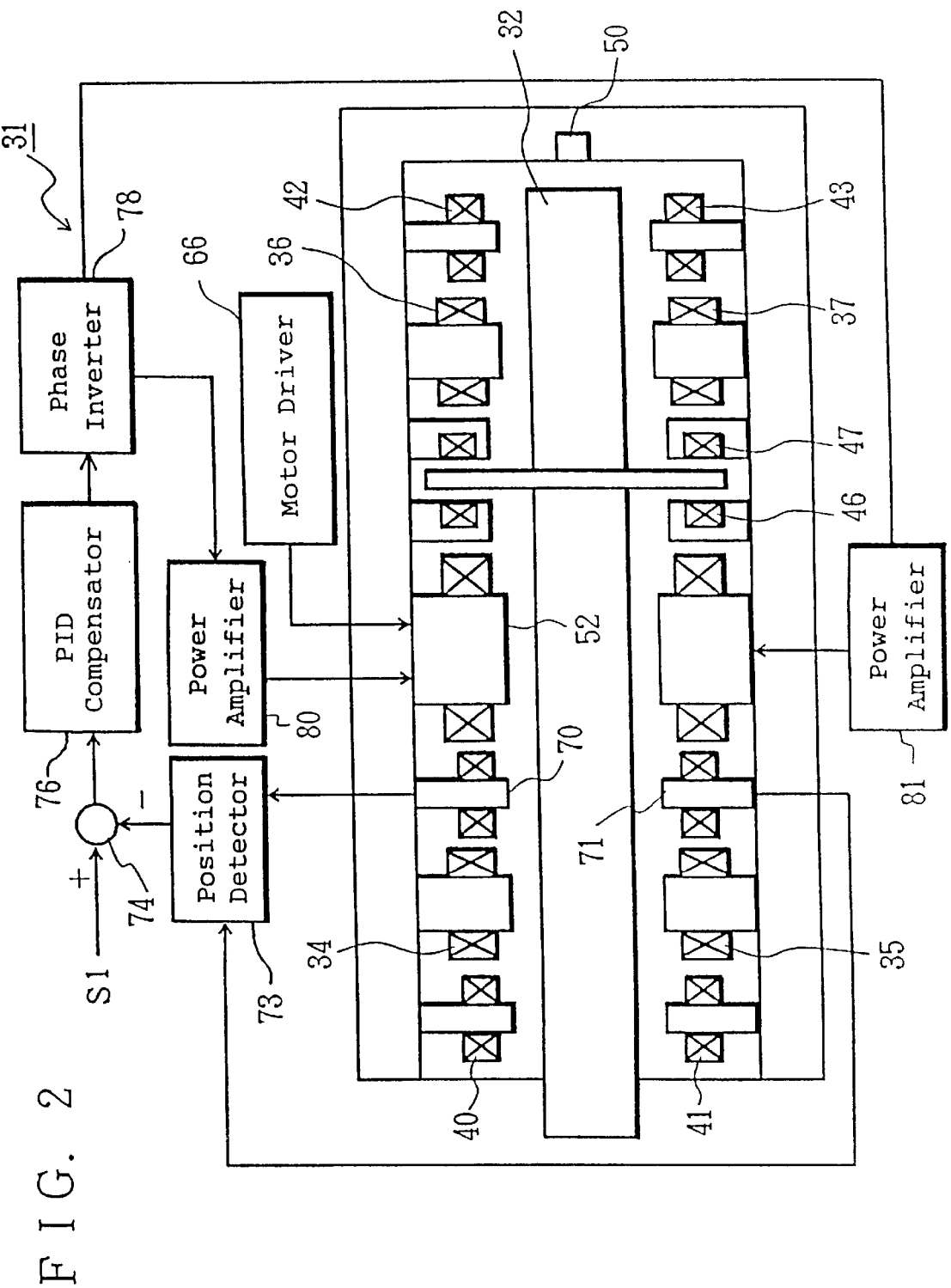
FIG. 2 is a structural view showing a primary part of a spindle apparatus according to a second embodiment of the invention.

FIG. 2 shows a spindle apparatus 31 in accordance with a second embodiment. Incidentally, the same reference numerals are used to designate the similar components used in the first embodiment and detailed explanation therefor will be omitted properly.

In this embodiment, positional sensors 70 and 71 for detecting an up-and-down positional shift of a rotary shaft 32 in FIG. 2 and two positional sensors (not shown) for detecting a positional shift in the vertical direction to the paper surface are provided adjacent to the magnetic bearing composite motor 52. Control circuits for controlling, on the basis of the outputs from the positional sensors 70 and 71, a power of the magnetic bearing windings of the magnetic bearing composite motor 52 are provided individually of and separately from the magnetic bearing composed of the electromagnets 34, 35, 36 and 37, respectively.

Namely, the positional sensors 70 and 71 are connected to a position detector 73 which in turn is connected to an arithmetic operator 74 to which a standard signal S1 is fed. Then, the arithmetic operator 74 is connected to a PID compensator 76 which in turn is connected to a phase invertor 78. Power amplifiers 80 and 81 for feeding the excited magnetic current to the magnetic bearing windings of the magnetic bearing composite motor 52 are connected to the phase invertor 78.

The foregoing control circuits are used to perform the feedback control of the excited magnetic current of the magnetic bearing windings of the magnetic bearing composite motor 52 on the basis of the positional sensors 71 and 72. Namely, the structure of the control circuits is the same as that of the control circuits for the magnetic bearing.

Accordingly, the control circuit system may attain the positional control of the rotary shaft 32 not only in the resonant frequency band but also over the full range. Namely, the spindle apparatus 31 according to this embodiment is provided with another radial magnetic bearing in addition to the radial bearing which is constituted by the electromagnets 34, 35, 36 and 37 and so on, and the rotary shaft 32 is supported at three positions in the radial direction.

The other structure is the same as that of the first embodiment.

In this embodiment, since the magnetic bearing composite motor 52 also functions as the radial magnetic bearing, it is possible to enhance a rigidity of the magnetic bearing.

Incidentally, in the type of the respective foregoing embodiments, the magnetic bearing composite motor 52 independently has the magnetic bearing windings and the motor windings, but it is possible to use a magnetic bearing motor in which the current for the magnetic bearing and the current for the motor are provided to a single winding.

In the spindle apparatus according to the present invention, since not only the first and second magnetic bearings provided at both ends but also the electromagnetic bearing composite motor interposed between the first and second magnetic bearings are used to control the position of the rotary shaft, it is possible to prevent the bending vibration of the rotary shaft from being generated.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A spindle apparatus comprising:
   a rotary shaft;
   magnetic bearing means for floatingly holding the rotary shaft by magnetic forces; and
   a combined motor and magnetic bearing device for imparting a rotational torque to the rotary shaft and for positionally controlling the rotary shaft by magnetic forces.

2. A spindle apparatus according to claim 1; further comprising position detecting means for detecting a floating position of the rotary shaft, and control means for outputting an exciting current to the magnetic bearing means and the combined motor and magnetic bearing device upon inputting a detection signal detected by the position detecting means to control the position of the rotary shaft to hold the rotary shaft afloat in a predetermined position.

3. A spindle apparatus according to claim 2; wherein the position detecting means comprises first position sensors disposed proximate the magnetic bearing means, and second position sensors disposed proximate the combined motor and magnetic bearing device.

4. A spindle apparatus comprising:
   a rotary shaft having first and second ends;
   a first magnetic bearing for floatingly holding the first end of the rotary shaft by magnetic forces;
   a second magnetic bearing for floatingly holding the second end of the rotary shaft by magnetic forces; and
   a combined motor and magnetic bearing device interposed between the first magnetic bearing and the second magnetic bearing for imparting a rotational torque to the rotary shaft and for positionally controlling the rotary shaft by the magnetic forces.

5. A spindle apparatus according to claim 4; wherein the first and second magnetic bearings are respectively provided with first and second positional sensors for detecting a position of the rotary shaft for positional control of the rotary shaft; and wherein the combined motor and magnetic bearing device carries out the positional control of the rotary shaft on the basis of a detected value of one of the first and second positional sensors.

6. A spindle apparatus according to claim 4; further comprising a positional sensor for detecting the position of the rotary shaft in the vicinity of the combined motor and magnetic bearing device for controlling the position of the rotary shaft.

7. A spindle apparatus according to claim 4; wherein the combined motor and magnetic bearing device controls the position of the rotary shaft in the vicinity of a frequency at which the rotary shaft is subjected to a bending vibration.

8. A spindle apparatus according to claim 4; further comprising position detecting means for detecting a floating position of the rotary shaft, and control means for outputting an exciting current to the first magnetic bearing, the second magnetic bearing and the combined motor and magnetic bearing device upon inputting a detection signal detected by the position detecting means to control the position of the rotary shaft to hold the rotary shaft afloat in a predetermined position.

9. A spindle apparatus according to claim 8; wherein the control means comprises a positional detector for outputting a positional signal on the basis of an output of the position detecting means, an arithmetic operator for subtracting a standard signal from the positional signal, a compensator for varying a phase of an output signal of the arithmetic operator, a phase inverter for inverting the phase of an output signal of the compensator, and power amplifiers each for amplifying the excited current of the first magnetic bearing, the second magnetic bearing and the combined motor and magnetic bearing device, respectively, in response to an output of the phase inverter.

10. A spindle apparatus, comprising:
    a rotary body;
    at least a pair of magnetic bearings for levitating the rotary body by magnetic forces;
    a combined motor and magnetic bearing device for rotating the rotary body and for controlling the position of the rotary body by magnetic forces; and
    a control circuit for outputting an exciting current to the magnetic bearings and the combined motor and magnetic bearing device and for making an adjustment of the exciting current of the magnetic bearing and the combined motor and magnetic bearing device to control the position of the rotary body to hold the rotary body afloat in a predetermined position.

11. A spindle apparatus according to claim 10; further comprising position detecting means for detecting a levitating position of the rotary body; and wherein the control circuit outputs an exciting current to the magnetic bearings and the combined motor and magnetic bearing device upon inputting a detection signal detected by the position detecting means.

12. A spindle apparatus according to claim 11; wherein the control circuit comprises a positional detector for outputting a positional signal on the basis of an output of the position detecting means, an arithmetic operator for subtracting a standard signal from the positional signal, a compensator for varying a phase of an output signal of the arithmetic operator, a phase inverter for inverting the phase of an output signal of the compensator, and power amplifiers each for amplifying the excited current of the magnetic bearings and the combined motor and magnetic bearing device, respectively, in response to an output of the phase inverter.

13. A spindle apparatus according to claim 10; wherein the combined motor and magnetic bearing device is disposed between the magnetic bearings.

14. A spindle apparatus according to claim 13; wherein the combined motor and magnetic bearing device is disposed proximate a central portion of the rotary body.

15. A spindle apparatus according to claim 10; wherein the combined motor and magnetic bearing device is disposed proximate a central portion of the rotary body.

16. A spindle apparatus according to claim 10; further comprising a position detecting device for detecting the position of the rotary body in the vicinity of the combined motor and magnetic bearing device; and wherein the control circuit outputs an exciting current to the combined motor and magnetic bearing device upon inputting a detection signal detected by the position detecting device.

* * * * *